June 11, 1963  T. O. SUMMERS  3,093,004
GAS ERECTED GYROSCOPE
Filed July 11, 1961  2 Sheets-Sheet 1

INVENTOR.
THOMAS O. SUMMERS
BY
R. E. Geauque
ATTORNEY

June 11, 1963   T. O. SUMMERS   3,093,004
GAS ERECTED GYROSCOPE

Filed July 11, 1961   2 Sheets-Sheet 2

INVENTOR.
THOMAS O. SUMMERS
BY R. E. Geauque
ATTORNEY

United States Patent Office 3,093,004
Patented June 11, 1963

3,093,004
GAS ERECTED GYROSCOPE
Thomas O. Summers, Encino, Calif., assignor to Guidance Technology, Inc., Santa Monica, Calif., a corporation of California
Filed July 11, 1961, Ser. No. 123,173
16 Claims. (Cl. 74—5.43)

This invention relates to a gas erected gyroscope and more particularly to gyroverticals in which the heat transfer properties and the density of the gas circulating medium is controlled to provide proper cooling of the gyro and a suitable erection force.

In present gas erected gyros, a gas is pumped into the inner gimbal and is expelled therefrom through pendulously controlled orifices adapted to erect the gyro. An impeller is affixed to the gyro rotor and the motor is capable of driving both the impeller and the gyro rotor. Since the gyro motor drives the impeller to pump air into and out of the rotor bearing casing, a high load is opposed by the pump upon the gyro motor and the motor is likely to overheat and burn out in a relatively short time. Therefore, the circulating gas must be one which provides an excellent heat transfer medium in order to hold this overheating to a minimum. Also, the density of the gas must be sufficient to provide the necessary erecting force at the orifices. In large high speed gyros, nitrogen instead of air has been utilized as a circulating medium and provides sufficient reaction force at the pendulous control exhaust orifices to adequately erect the gyro. However, in small gyros, nitrogen provides an insufficient density to develop adequate erecting torque and also does not have sufficiently good heat transfer characteristics to minimize hot spots.

Another present form of gas erection systems utilizes cool air supply from outside the case to erect the gyro by leading it through the gimbals and gimbal bearings directly to the rotor bearing casing, from which it is exhausted by an externally located vacuum pump adapted to pump the air from the instrument housing. This construction is complicated and unreliable in that the air shields which must be associated with the gimbal bearings induce excessive friction, impairing the accuracy of the gyro. Also, dust particles from the outside are likely to infiltrate into the gimbal bearings and reduce the instrument's reliability, and since the circulating air is not completely inert, corrosion of parts within the instrument cannot be completely avoided.

By the present invention, a closed gas erection system is provided in which the instrument case is sealed and an impeller, driven by the gyro motor, pumps an inert gas mixture into the rotor bearing casing and exhausts it through pendulously controlled orifices adapted to erect the gyro. In all cases, the circulating gas medium or mixture comprises a portion of helium gas which has a low density but which has the highest coefficient of thermal conductivity of the inert gases. When the gyro casing is not pressurized, the helium can be mixed with xenon which has the highest density of the inert gases or with other high density inert gases. Xenon has about five times the density of nitrogen and provides the gas medium with sufficient density to erect even a sub-miniature gyrovertical. When it is possible to pressurize the sealed casing of the gyro, the helium can be mixed with inexpensive inert nitrogen and because of the increased pressure of the mixture, the required erection rate of the gyro is obtained. Normally, nitrogen has about the same density as air, but through pressurization, the density can be increased to obtain sufficient erecting force. In either mixture, the presence of helium provides the gas mixture with an overall heat transfer coefficient which prevents overheating of the gyro. The erecting rate of the gyrovertical can be externally controlled without removing the gyro from its case simply by changing the pressure of the gas mixture and/or its composition. In general, the gases of the erecting medium are mixed in a ratio to provide an adequate heat transfer to enable the gyro to run for long periods without overheating and to obtain any desired erection rate.

It is therefore an object of the present invention to provide a gas erected gyroscope housed within a sealed casing containing an inert gas mixture of sufficient density and thermal conductivity to positively erect the gyro while at the same time minimize gyro motor heating.

Another object of the invention is to provide a gas mixture for erecting gyroscopes, which mixture has both high density and high heat transfer characteristics for an inert gas.

A further object of the invention is to provide means for adjusting the erecting rate of a gyrovertical from outside the sealed instrument casing by controlling the ratio of two inert gases of widely varying densities forming the erecting gas mixture.

Another object of the invention is to provide a means for adjusting the erecting rate of a gyrovertical from outside the sealed instrument casing by controlling the pressure of the erecting gas mixture contained within the casing.

Still another object of the invention is to provide a circulating gas medium for erecting a gyrovertical, which mixture includes xenon having the highest density of the inert gases and helium having the highest coefficient of thermal conductivity of the inert gases.

Another object of the invention is to provide a circulating gas medium for erecting a gyrovertical which includes a mixture of nitrogen and helium which has the necessary heat transfer properties and is pressurized to obtain the density required for erection of the gyro.

These and other objects of the invention not specifically set forth above will become readily apparent from the accompanying description and drawings, in which.

Figure 1:
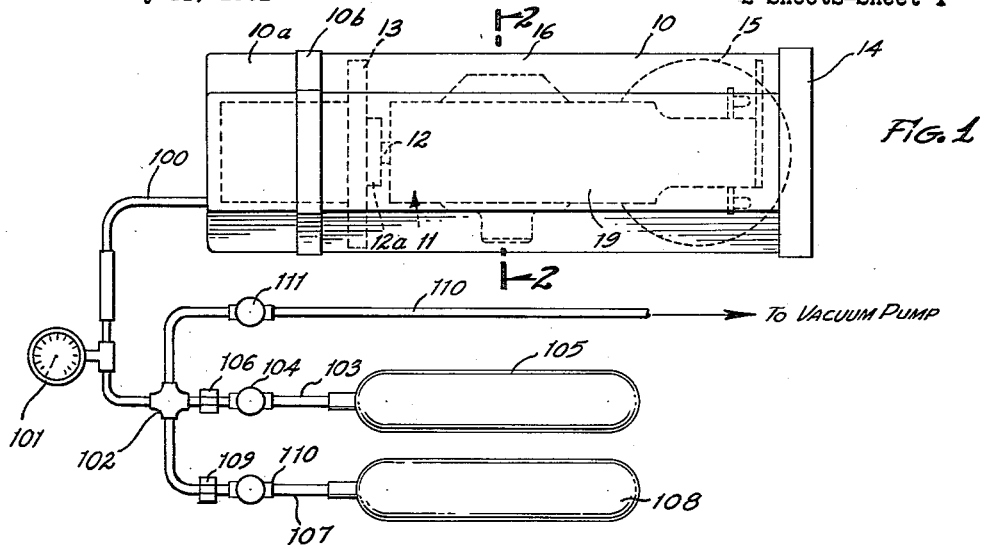
FIGURE 1 is a diagrammatic view of the charging system of the present invention for charging the sealed casing of a gyrovertical with a gas erecting medium of the present invention.

Referring to FIGURE 1, there is shown an attitude indicator similar to those disclosed in pending United States application Serial No. 56,446 filed September 16, 1960, by applicant and assigned to the same assignee. The instrument has a casing 10 which contains a cantilevered outer gimbal 11 supported by a single shaft 12. The shaft is mounted in a suitable bearing structure 12a secured within a central mounting plate 13. The casing has a cap 10a which is secured to the main casing by a sealing strip 10b so that the inside of the casing is hermetically sealed. The opposite end 14 of the casing is closed by a transparent glass panel carrying an indicator which cooperates with indices on indicating sphere 15 and on the gimbal to provide an indication of pitch and roll. The indicating sphere 15 is secured to the end of the outer gimbal 11 for rotation upon a change in pitch of the mounting aircraft by a gyrovertical 16 located between the indicating sphere and the shaft 12.

The gyrovertical 16 comprises an inner gimbal 17 which is rotatably mounted on sides 18 and 19 of the outer gimbal 11 by shafts 20 and 21, respectively, which are retained in suitable ball bearing structures 23 in the gimbal sides. The ends of shafts 20 and 21 have slip rings 24 which coact with wipers 25 to provide suitable electrical connections for the gyrovertical. A pulley 26 is secured to one side of the inner gimbal 17 about the axis shaft 21 in order to drive indicating sphere 15, through a suitable connection, in the direction to indicate pitch. The ball bearing structures 23 and 24 each have outer races which are held in position by retaining elements 27 and 28, respectively, while the inner races are retained by shoulders on the shafts. It is therefore apparent that the instrument casing 10 can move with the mounting aircraft about the inner and outer gimbal axes while the gyro maintains a gravity vertical position as a reference.

The gyro rotor has a stationary shaft 30 extending through the inner gimbal, and nuts 31 and 32 on opposite ends of the shaft serve to hold the sections 33 and 34 of the inner gimbal 17 together. The shaft is aligned by extension 35 on the upper section 34 and by extension 35a on the lower section 33. The gyro rotor comprises upper and lower sections 36 and 36a which are rotatably mounted by bearings 37 and 38, each having an inner race 39 held against a shoulder 40 of the shaft 30. The outer race 41 of bearing 37 is secured by an impeller plate 42 secured to the rotor section 36 by a plurality of bolts 43. The outer race of bearing 38 is held in position by retaining plate 44 which is secured to the rotor section 36a by a plurality of bolts 45.

A rotor ring 50 is located between the upper and lower rotor sections 36 and 36a and is secured by means of bolts 51 and 52. The enlarged center portion 30a of the shaft 30 carries laminations 54 which support winding 55 and an armature 56 is supported by the rotor ring 50 in position opposite the laminations 55. It is understood that the winding 55 is connected to several of the slip rings 22 for energization thereby in order to rotate ring 50 and the rotor sections 36 and 36a attached thereto.

Figure 2:
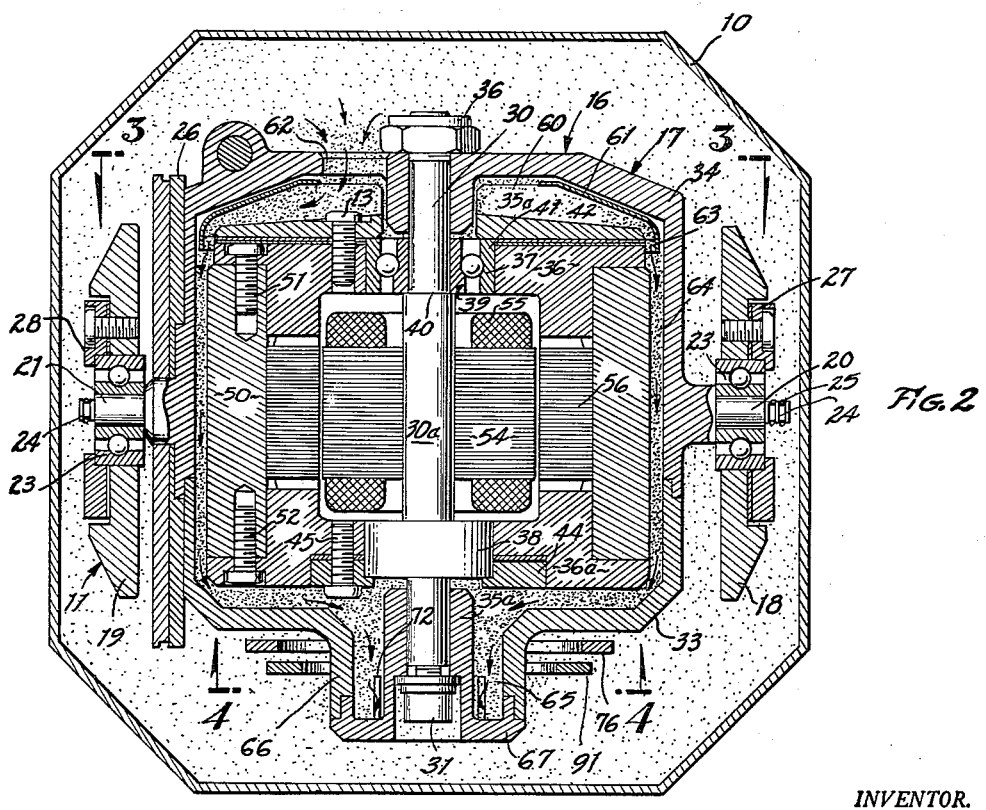
FIGURE 2 is a vertical section along line 2—2 of FIGURE 1 illustrating the gyro rotor and motor of the erected gyrovertical.
Figure 3:
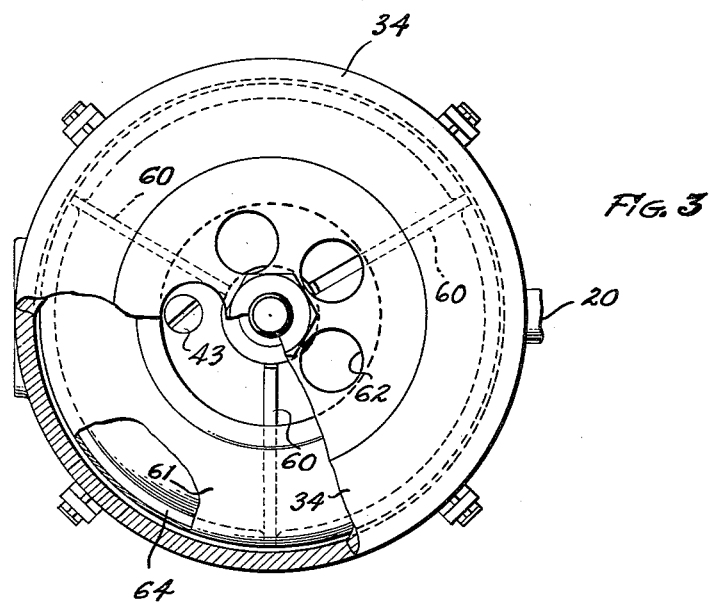
FIGURE 3 is a horizontal section along line 3—3 of FIGURE 2 showing the impellers driven by a gyro motor for pumping the gas erecting medium through the erecting orifices or jets.
Figure 4:
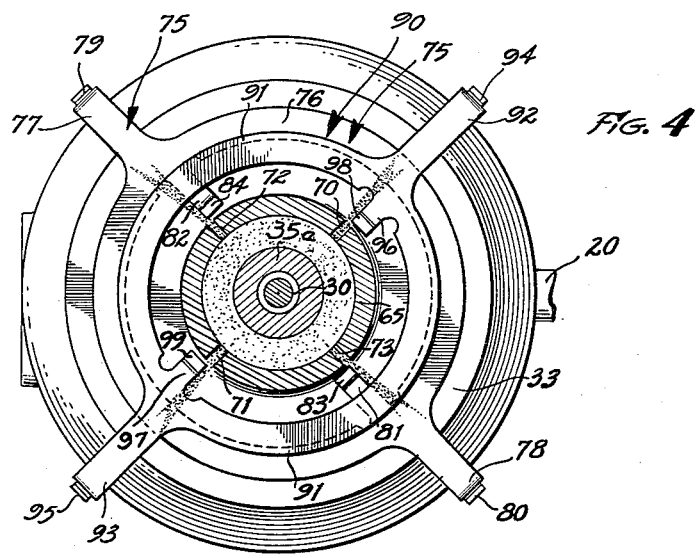
FIGURE 4 is a horizontal view along line 4—4 of FIGURE 2 illustrating the pendulous flippers for controlling the erecting jet.

As illustrated in FIGURES 2 and 3, the impeller plate 42 carries a plurality of impeller vanes 60 which are covered by a shroud 61 located adjacent the top of the inner gimbal casing section 34. The casing section 34 contains a plurality of gas openings 62 and the shroud forms an outlet space 36 through which gas is discharged to space 64 from the openings 62. The annular space 64 extends between the inner gimbal 17 and the rotor ring 50 and terminates in a space 65 located in a projection 66 of gimbal section 33.

The space 65 is covered by the flange 67 on the extension 35a.

Referring to FIGURES 2 and 3, the casing projection 66 contains a first pair of opposed jet slots 70 and 71 and a second pair of opposed jet slots 72 and 73 and the pairs of slots are located in planes perpendicular to one another. A first pendulous flipper 75 comprises a ring 76 surrounding the projection 66 and having arms 77 and 78 extending upward around the inner gimbal section 33. Pins 79 and 80 serve to pivotally support the arms so that the flipper 75 will hang downward in gravity vertical position. The ring 76 also carries inwardly projecting arm portions 81 and 82 which have downwardly projecting jet control portions 83 and 84, respectively. The control portions 83 and 84 remain in gravity vertical position and vary the area of jets 72 and 73, respectively, should the inner gimbal move away from gravity vertical position.

In a similar manner, a pendulous flipper 90 has ring 91 located below ring 76 of the pendulous flipper 75 and ring 91 has arms 92 and 93 extending around the gimbal section 33. Pivots 94 and 95 serve to pivotally mount the arms to the gimbal section 34 so that the flipper 90 assumes a gravity vertical position. Arm portions 96 and 97 project inwardly from ring 91 and have control portions 98 and 99 which are positioned opposite the jets 70 and 71, respectively, in order to control the discharge area of these jets.

Normally, both of the flippers 75 and 90 and the gyro rotor spin axis are vertical and the control portions in front of respective jets equally impair the gas escaping from the jets. Thus, the two pairs of equally and oppositely directed jets produce two pairs of equal and opposite torques about the inner gimbal axis. Since the planes of the two pairs of jets are perpendicular to one another and each plane is at an angle to the outer gimbal axis, each flipper will be affected by deviations of the gyro spin axis from vertical about either the inner or outer gimbal axis. Thus, upon displacement of either the outer gimbal or the inner gimbal from the vertical position, each of the pendulous flippers will move to open one of its controlled openings and close the other so that a resultant torque will be produced about the pitch and/or roll axes to precess the gyro rotor back to the vertical.

The impellers 60 produce a sufficient gas pressure to drive the erecting gas mixture through the inner gimbal casing and to circulate the mixture throughout the casing 10 in order to maintain an even temperature throughout the casing. In order to prevent a high motor temperature and bearing temperature from developing, the gas mixture contains a portion of helium which has the highest coefficient of heat transfer of the inert gases. Thus, the gas mixture passing over the gyro rotor and around the gyro rotor bearings is able to pick up a sufficient amount of heat to prevent the temperature from these components from rising to an excessive value.

At the same time, it is necessary that the erecting mixture have high enough density to produce the necessary reaction forces upon the gimbals to produce the required forces to erect the gyroscope at the desired rate and maintain its spin axis of the vertical position. When it is desired to hold a low gas pressure in casing 10, such as atmospheric pressure xenon is mixed with the helium to produce the erecting gas mixture. Xenon has a weight of approximately 4.5 times that of air while helium has a weight of approximately .14 times that of air. When these two gases are mixed approximately 50 percent by volume, the resulting mixture is approximately 2.3 times the weight of air and has good heat transfer properties because of the presence of the helium. Thus, this gas mixture provides both high density and high thermal conductivity with the result that sufficient erecting force can be developed to positively erect the gyro while at the same time, minimizing the motor heating.

Referring to FIGURE 1, the casing 10 is charged by passage 100 which connects between a casing fitting (not shown) and a four-way fitting 102 and the passage contains a pressure meter 101. A pasasge 103 connects a helium tank 105 to fitting 102 and contains valve 104 and a volume flow meter 106 of well known construction. Also, a passage 107 connects xenon tank 108 to the fitting 102 and contains flow meter 109 and valve 110. Finally, a passage 110 contains a valve 111 and connects the fitting 102 to a vacuum pump (not shown) which serves to remove air from the casing 10 prior to the charging of the casing with a mixture of helium and xenon. When all the air has been removed from the casing 10, valve 111 is closed and thereafter, the valve 104 can be opened to place a charge of helium within the casing as determined by the reading of the flow meter 106. After valve 104 is closed, valve 110 can be opened to place an additional amount of xenon in the casing 10 as indicated by the flow meter 109 and the total pressure of the two charges will appear at the meter 101. While the ratio of the volume of xenon and helium can be varied within fairly wide limits, the ratio of 50 percent by volume of each results in a mixture which has good operating characteristics at low chamber pressures. Because of the density of xenon, the gas mixture in the casing can be held at about atmospheric pressure so that leakage through hermetically sealed casing 10 will be a minimum. It is understood that both helium and xenon in the tanks 105 and 108 are under pressures above the final pressure which is desired within the casing 10.

When the casing 10 can be charged to the high pressures, the contents of the tank 108 can be nitrogen instead of xenon and the pressures of helium in the tank 105 and the nitrogen in tank 108 will be above the final elevated pressure in the casing 110. Since nitrogen has a weight of approximately .97 times that of air and helium has a weight of approximately .14 times that of air, a mixture of 75 percent nitrogen and 25 percent helium by volume will have a weight of approximately .76 times that of air. Since the volume of casing 10 is constant, the density of the gas mixture within the casing would be directly proportional to the pressure within the casing. Thus, if such a mixture were introduced to the casing to produce a pressure of five atmospheres, the density of the mixture would be about 3.8 times that of air at atmospheric pressure. Under such conditions, the mixture of nitrogen and helium would be a suitable replacement for the 50–50 atmospheric pressure mixture of xenon and helium. At the same time, the nitrogen-helium mixture would have good transfer properties to maintain the gyro rotor and bearings cool and free from hot spots because of the pressure of the helium in the mixture. Thus, comparatively low cost inert nitrogen can be mixed with inert helium at the ratio to provide an adequate gyro erecting rate and adequate heat transfer to enable the gyro to run for long periods without overheating.

By the present invention, a low pressure inert gas erecting mixture is provided and the ratio between the gas components can be varied to vary the erection rate and cooling properties. Since the gyro casing can be charged with the gas components from outside the casing, the erection rate can be varied externally. When the casing pressure can be substantially increased, an inexpensive mixture of inert gases can be utilized under pressure in the casing and the ratio of these gases and the mixture pressure can be controlled externally of the casing. While a mixture of xenon and helium is recommended for low pressure mixtures and a mixture of nitrogen and helium is recommended for higher pressure mixtures, it is understood that other inert gases having good heat transfer properties and suitable densities can be substituted for the recommended gases as long as the mixtures of the gases have the required heat transfer coefficient to maintain the cooling of the instrument and have the required density characteristics to provide the desired erection rate. It is further understood that the invention can be utilized with various constructions of gyroverticals in addition to the constructions illustrated and that gas erected gyroscopes could be utilized in any suitable control system in addition to the attitude indicator chosen for illustration. Various other modifications are contemplated by those skilled in the art without departing from the spirit and scope of the invention as hereinafer defined by the appended claims.

What is claimed is:

1. A gas erected gyrovertical comprising a sealed casing containing a gas erecting medium, a gyro rotor supported within said casing by a gimbal, jet means associated with said gimbal, means for impelling said medium through said jet means to produce an erecting force on said gimbal, gravity sensitive means for varying the discharge of said jet means to maintain said gyrovertical in gravity vertical position and means located externally of said casing for controlling the properties of said medium.

2. A gas erected gyrovertical as defined in claim 1 wherein said controlling means comprises gas supply means under pressure and selectively connectable with said casing for controlling the composition and pressure of said medium.

3. A gas erected gyrovertical as defined in claim 2 wherein said gas supply means comprises a supply tank of helium having excellent heat transfer properties for an inert gas in order to prevent hot spots from developing within said casing.

4. A gas erected gyrovertical comprising a gyro rotor structure supported by an inner gimbal within a sealed casing, a gas erecting medium within said casing, jet means in said inner gimbal, gravity sensitive means for controlling the discharge area of said jet means, means for circulating said medium around said gyro rotor structure and through said jet means to gravity erect said gyrovertical, and means located externally of said casing for controlling the properties of said medium in order to regulate the erecting force and the heat transfer properties of said medium.

5. A gas erected gyrovertical as defined in claim 4 wherein said controlling means comprises supplies of separate gases located externally of said casing and means for charging said casing with the desired percentage of each gas and to a desired pressure of said medium.

6. A gas erected gyrovertical as defined in claim 5 having means for removing gas from said casing prior to charging the casing with said medium.

7. A gas erected gyrovertical as defined in claim 6 wherein said controlling means comprises a single passage connected with said casing and containing a pressure meter, fitting means for connecting said separate supplies and said removing means to said single passage, said removing means comprising a conduit connected to a vacuum source and containing a valve, each of said gas supplies comprising a pressurized tank connected to said fitting means through a conduit containing a valve.

8. A gas erected gyrovertical as defined in claim 4 wherein one of said gas supplies is helium having excellent heat transfer properties for an inert gas.

9. A gas erected gyrovertical as defined in claim 8 wherein another of said gas supplies is xenon having high density for an inert gas to produce the required erecting force.

10. A gas erected gyrovertical as defined in claim 8 wherein another of said gas supplies is nitrogen providing an inexpensive inert gas with which to charge said casing to high pressure to produce the required erecting force.

11. In a gas erected gyrovertical, a sealed casing containing inner and outer gimbals, a gas erecting medium within said casing, a gyro rotor contained within said inner gimbal, means for rotating said gyro rotor, jet means located in perpendicular planes in said inner gimbal, means for impelling said medium around said gyro rotor and through said jet means to produce erecting force on said gyrovertical, and gravity sensitive means for controlling the discharge area of said jet means to regulate said erecting force and thereby gravity erect said gyrovertical, said medium comprising a mixture of two inert gases, one of said gases having a high heat transfer coefficient for an inert gas to maintain uniform temperature in said casing and the other having a high density for an inert gas to produce the required erecting force.

12. In a gas erected gyrovertical as defined in claim 1 wherein said medium consists of a mixture of helium having the high heat transfer coefficient and xenon having the high density.

13. In a gas erected gyrovertical as defined in claim 1 having means located externally of said casing for controlling the percentage of each gas in said mixture in order to obtain a desired erection rate.

14. In a gas erected gyrovertical, a sealed casing containing inner and outer gimbals, a gas erecting medium within said casing, a gyro rotor contained within said inner gimbal, means for rotating said rotor, jet means located in perpendicular planes in said inner gimbal, means for impelling said medium around said gyro rotor through said jet means to produce erecting forces on said gyrovertical, and gravity sensitive means for controlling the discharge area of said jet means to regulate said erecting forces and thereby continually gravity erect said gyrovertical, said erecting medium comprising a pressurized mixture of two inert gases, one of said gases having excellent heat transfer properties for maintaining uniform temperature in said casing and the other having sufficient density to produce the required erecting force at the pressure of the mixture.

15. In a gas erected gyrovertical as defined in claim 14 wherein said medium consists of a mixture of helium having the excellent heat transfer properties and nitrogen for providing the required mixture density.

16. In a gas erected gyrovertical as defined in claim 14 having means located externally of said casing for controlling the percentage of each gas in the mixture and the pressure of the mixture.

References Cited in the file of this patent

UNITED STATES PATENTS

| | | |
|---|---|---|
| 2,311,652 | Esval | Feb. 23, 1943 |
| 2,602,334 | Tracy | July 8, 1952 |